US010123491B2

(12) United States Patent
De Fazio et al.

(10) Patent No.: US 10,123,491 B2
(45) Date of Patent: Nov. 13, 2018

(54) AEROPONICS SYSTEM WITH MICROFLUIDIC DIE AND SENSORS FOR FEEDBACK CONTROL

(71) Applicant: STMicroelectronics, Inc., Coppell, TX (US)

(72) Inventors: Marco De Fazio, Arlington, MA (US); Simon Dodd, West Linn, OR (US)

(73) Assignee: STMicroelectronics, Inc., Coppell, TX (US)

( * ) Notice: Subject to any disclaimer, the term of this patent is extended or adjusted under 35 U.S.C. 154(b) by 303 days.

(21) Appl. No.: 14/985,128

(22) Filed: Dec. 30, 2015

(65) Prior Publication Data
US 2017/0188526 A1 Jul. 6, 2017

(51) Int. Cl.
| | | |
|---|---|---|
| *A01G 31/00* | (2018.01) | |
| *G05B 15/02* | (2006.01) | |
| *A01G 25/02* | (2006.01) | |
| *A01G 31/02* | (2006.01) | |
| *A01G 9/14* | (2006.01) | |

(52) U.S. Cl.
CPC ............ *A01G 25/02* (2013.01); *A01G 31/02* (2013.01); *G05B 15/02* (2013.01); *A01G 9/14* (2013.01); *G05B 2219/2625* (2013.01); *Y02A 40/252* (2018.01); *Y02P 60/216* (2015.11)

(58) Field of Classification Search
CPC .......... A01G 25/02; A01G 31/02; A01G 9/14; G05B 15/02; G05B 2219/2625; Y02P 60/216
USPC ........................................................ 47/62 A
See application file for complete search history.

(56) References Cited

U.S. PATENT DOCUMENTS

| | | | | |
|---|---|---|---|---|
| 4,332,105 A | * | 6/1982 | Nir ......................... | A01G 31/02 137/563 |
| 6,863,375 B2 | * | 3/2005 | Makigaki .................. | B41J 2/16 347/47 |
| 7,070,263 B2 | * | 7/2006 | Okazawa ................. | B41J 2/055 347/68 |
| 8,291,639 B2 | * | 10/2012 | Gardner ................... | A01G 9/16 47/60 |
| 8,643,495 B2 | | 2/2014 | Lan et al. | |
| 2009/0293357 A1 | | 12/2009 | Vickers et al. | |
| 2011/0023359 A1 | * | 2/2011 | Raring .................... | A01G 31/02 47/62 A |
| 2013/0042244 A1 | | 2/2013 | Li et al. | |
| 2014/0144078 A1 | | 5/2014 | Gonyer et al. | |

(Continued)

FOREIGN PATENT DOCUMENTS

| | | | |
|---|---|---|---|
| CA | 2 889 597 A1 | 5/2014 | |
| CA | 2 946 738 A1 | 10/2015 | |

(Continued)

OTHER PUBLICATIONS

Grossmann et al., "The RootChip: An Integrated Microfluidic Chip for Plant Science," *The Plant Cell* 23:4234-4240, Dec. 2011.

*Primary Examiner* — Mark A Connolly
(74) *Attorney, Agent, or Firm* — Seed Intellectual Property Law Group LLP

(57) ABSTRACT

The present disclosure is directed to a greenhouse or single container for plant growth coupled to the Internet of Things and including a microfluidic die for water or nutrient distribution. The microfluidic die is controllable automatically or with instructions from a remote user, based on sensors included within a growth environment.

25 Claims, 18 Drawing Sheets

(56) References Cited

U.S. PATENT DOCUMENTS

| | | | |
|---|---|---|---|
| 2014/0244017 A1 | 8/2014 | Freiwirth et al. | |
| 2015/0082669 A1* | 3/2015 | Peikert | A43B 7/125 36/30 R |
| 2015/0305258 A1* | 10/2015 | Broutin Farah | A01G 31/00 700/90 |
| 2015/0367373 A1 | 12/2015 | Dodd et al. | |

FOREIGN PATENT DOCUMENTS

| | | |
|---|---|---|
| JP | 4677164 B2 | 4/2011 |
| WO | 2009/066991 A2 | 5/2009 |

\* cited by examiner

AEROPONICS SYSTEM WITH MICROFLUIDIC DIE AND SENSORS FOR FEEDBACK CONTROL

BACKGROUND

Technical Field

The present disclosure is directed to an aeroponics system that includes microfluidic die for nutrient and water distribution.

Description of the Related Art

Aeroponics is a process of growing plants without soil, where the plant's roots are suspended in air and receive moisture from mist or other water distribution methods. Existing aeroponics systems incorporate misters that provide water and other nutrients to the roots. The misters have large droplets of water that are not precisely controllable or adaptable.

There are a plethora of devices out in the marketplace that detect qualities about the environment, such as temperature, ambient light, and humidity. These devices can now communicate with each other through the Internet of Things. The Internet of Things is "an Internet of things connected," that extends to any things to carry out information exchange and communication. It is a network to connect any devices and the Internet to carry out information exchange and communication by way of information sensing devices such as humidity sensors, pressure sensors, temperature sensors, light sensors, infrared sensors, and global positioning systems, to name a few. They can communicate based on an agreed protocol to achieve intelligent identification, positioning, tracking, monitoring and management.

In this network, articles can communicate with each other without the intervention of a user. Each device has access to a receiver for corresponding information, a data transmission channel, a storage function, processing circuitry, an operating system, a specific application, and a data transmitter. The device is either coupled to or includes its own processing and data transmission features. The device is configured to follow the communication protocol of the Internet of Things. In addition, each device will have a unique serial number to identify the device in the Internet of Things.

The Internet of Things applies to a variety of fields such as intelligent traffic, environmental protection, government work, public security, secure household, intelligent fire control, industrial monitoring, older care, personal health, flower planting, water system monitoring, food origination, and enemy inspection, to intelligence collection and so on. This includes having sensors embedded and equipped into various objects such as power grid, railways, bridges, tunnels, highways, architectures, water supply systems, dams, and oil and gas pipelines. These sensors then communicate with a centralized user application, either automatically or manually, to manage and control the objects, personnel, machine, equipment and facilities in the network in real time. This allows the user to manage the production and life in a more delicate and dynamic manner, achieving an "intelligent" state, improving the utilization rate of the resources and the production level, and providing us with more information about our environment.

BRIEF SUMMARY

The present disclosure is directed to providing precise control and delivery of fluid, water or nutrients, or deterrents, such as pesticides, to roots of a plant in an aeroponics system with microfluidic delivery units including microfluidic die. The die include a substrate, chambers, and nozzles that allow for precise delivery of a selected volume of fluid at a specific rate and droplet size, for example.

In one embodiment, a container includes a plurality of die positioned within a central area, which provide a mist pattern of fluid to a root ball suspended within the container. A controller receives instructions either automatically based on sensors included in and around the container or directly from a user. The controller then controls the microfluidic die to eject fluid at a rate, pressure, and volume specific to the root ball.

The aeroponics systems of the present disclosure are integratable with the Internet of Things, which allows devices to communicate automatically with each other and communicate data to a remote user. For example, the microfluidic die can be included in an array of plant growth containers in a greenhouse where each container has a humidity sensor that monitors a moisture content of the associated container. The sensors can transmit data to a remote user who can provide instructions to provide water, in a specific amount, to a container that is low on moisture. Alternatively, a controller can process the sensor data and provide water when one container is below a threshold moisture amount without input from the user. Such a closed loop system can sense, take an action, and sense again, all without any external input. There is an infinite ability to automate this system using the sensors, controllers, and microfluidic die.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

Figure 1:
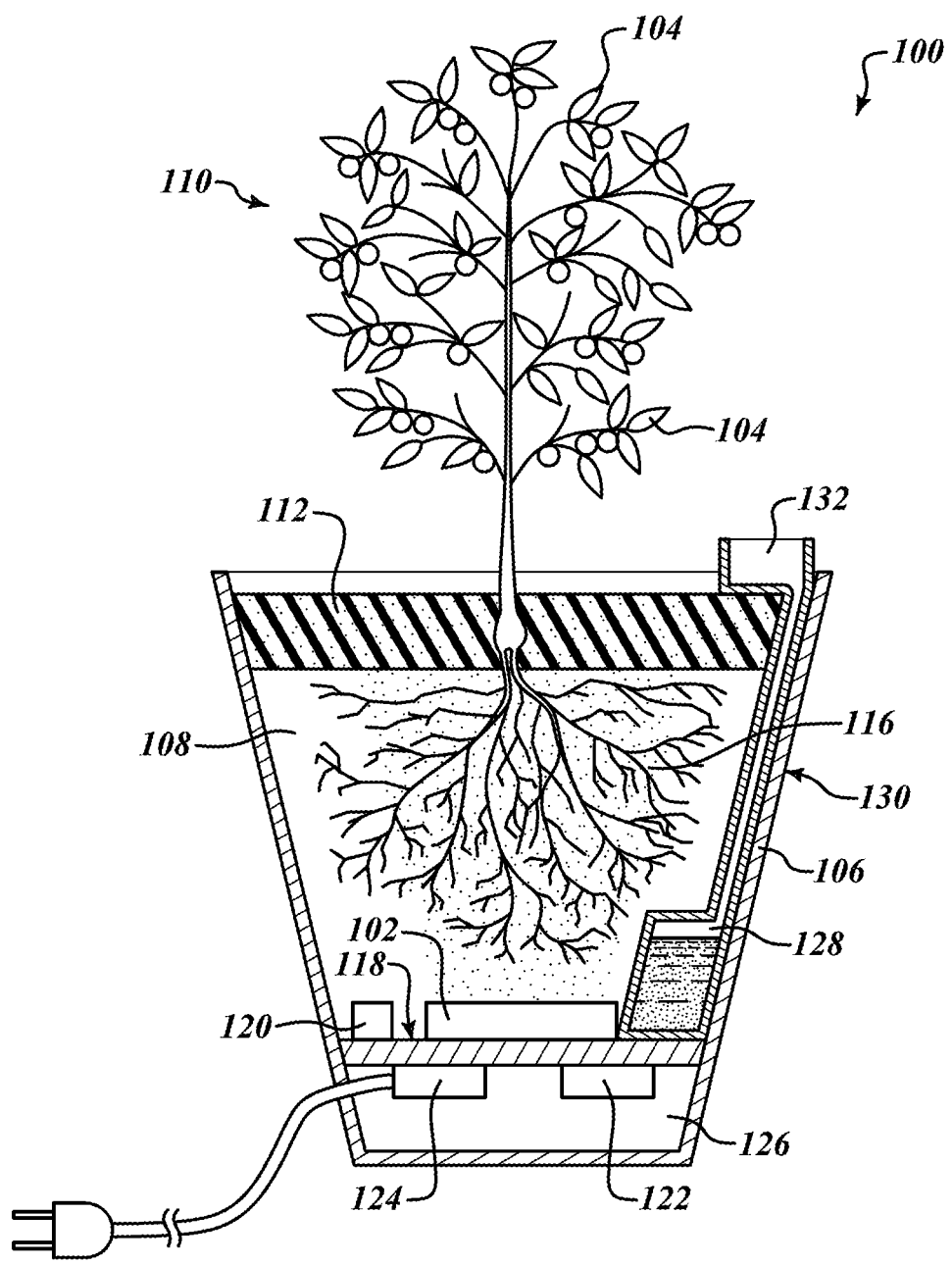
FIGS. 1-3 are views of an aeroponics system that includes a microfluidic die at different stages of growth of a plant according to an embodiment of the present disclosure.

In the following description, certain specific details are set forth in order to provide a thorough understanding of various embodiments of the disclosure. However, one skilled in the art will understand that the disclosure may be practiced without these specific details. In other instances, well-known structures associated with electronic components and semiconductor fabrication have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

The present disclosure is directed to various embodiments of an aeroponics system that includes a plurality of microfluidic delivery members, a plurality of sensors, and processing circuitry to receive data from the sensors and control the microfluidic delivery member. The aeroponics system may include a single plant in a single container, a plurality of containers, or a plurality of plants in a trough or other multi-plant growth container. The microfluidic delivery member includes a microfluidic die and associated electronic circuitry to control aspects of fluid delivery to and from the microfluidic die. The system may include a single microfluidic die or multiple microfluidic die. The systems in this disclosure are configured to be used with the Internet of Things (IoT). The IoT includes a plurality of devices that are interconnected via the internet or other communication mechanism. The IoT is a network of devices that communicate over a standard protocol, where each device is potentially readable, recognizable, locatable, addressable, and controllable via an IoT communications network. In alternative embodiments, the system could have all components hard wired together to be a stand-alone system with fluids plumbed into the system and dispensed as needed.

The plurality of devices can communicate with each other with or without user input such that some portions of the system can be automated. For example, a moisture sensor in the aeroponics system provides a microprocessor or other processing circuitry with data about the moisture level. If the moisture level is below a threshold, the microprocessor can activate a microfluidic die that distributes water. This is all achievable without input by a user.

The feedback loop could implement specific algorithms such as PID, those could reside in the local microcontroller or in a remote device connected through the IoT network. Also machine learning algorithms could be implemented, and by using data from several systems, the control loop could evolve in order to become more efficient in the dispensing of the correct amount of water and nutrients.

The IoT also allows a remote user to interact with the devices in the network. For example, the moisture sensor and processing circuitry determine that the moisture is below a threshold. The user then receives an indication, such as by email or through a notification via a remote communication device, such as a cellphone, tablet, or other computing device. The user can evaluate the information from the aeroponics system and instruct the system to provide water to a specific plant that has lower moisture content. The system allows the user to instruct the system to provide a specific amount of water or nutrients and allows the user to customize the parameters, such as the rate of flow.

Different from the conventional Internet, endpoint devices associated with the Internet of Things often include machines that do not have traditional user input and output interfaces. For example, an endpoint machine communicatively coupled into the Internet of Things will often be configured without a display controller, a keyboard controller, a mouse controller, a touch controller, or any other human user input and output communication interface often associated with a conventional Internet device (e.g., a personal computer (PC), a smart phone, a personal digital assistant (PDA), a tablet, a laptop computer, and the like). The machine may include certain annunciators, switches, sensors, rudimentary displays, wired or wireless control devices, and the like. Nevertheless, the machine will typically not have the type of human interfaces generally associated with a computing device that communicates via the conventional Internet.

Any machine associated with the Internet is typically assigned an Internet Protocol (IP) address. The IP address is sufficient to uniquely identify the machine within a particular network. In some cases, a single machine is uniquely identified within the broad Internet. That is, the machine can bi-directionally communicate in a one-to-one relationship with another machine coupled to the Internet.

In some cases, a single machine has an IP address that is unique within a local area network (LAN). In this circumstance, the local area network has a machine coupled to the Internet, and from within the LAN, other machines are able to communicate to machines coupled to the Internet. In this case, two or more machines are configured in a LAN, and a designated machine in the LAN has an IP address unique on the Internet. Each of the several machines in the LAN can communicate through the designated machine to other Internet-accessible machines.

Internet of Things machines are currently in their infancy. Many conventional machines that have not previously been coupled to the Internet are now being configured for Internet communications. That is, the conventional machines are being configured with a transceiver and other hardware, firmware, and software to enable Internet communications. The machine is assigned an IP address, which is unique within a LAN or within the broad Internet.

The types of machines now being configured for Internet communications perform industrial functions, commercial functions, consumer functions, or other functions. These machines may include vending machines, packaging equipment, utility meters, parking meters, factory automation, remote antenna monitoring equipment, automotive vehicles, trains, and many, many more. These devices, which now include hardware and software that enable Internet communications, are referred to as network enabled devices. Furthermore, even though these devices are still in the infancy of the Internet of Things, they are nevertheless referenced herein as conventional network enabled devices.

Figure 2:
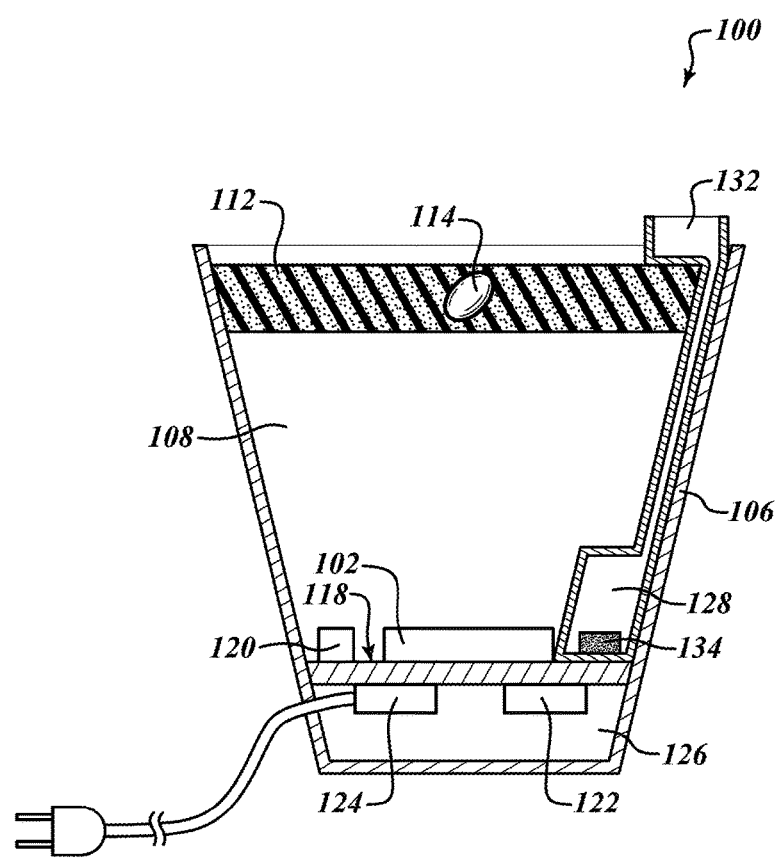
Figure 3:
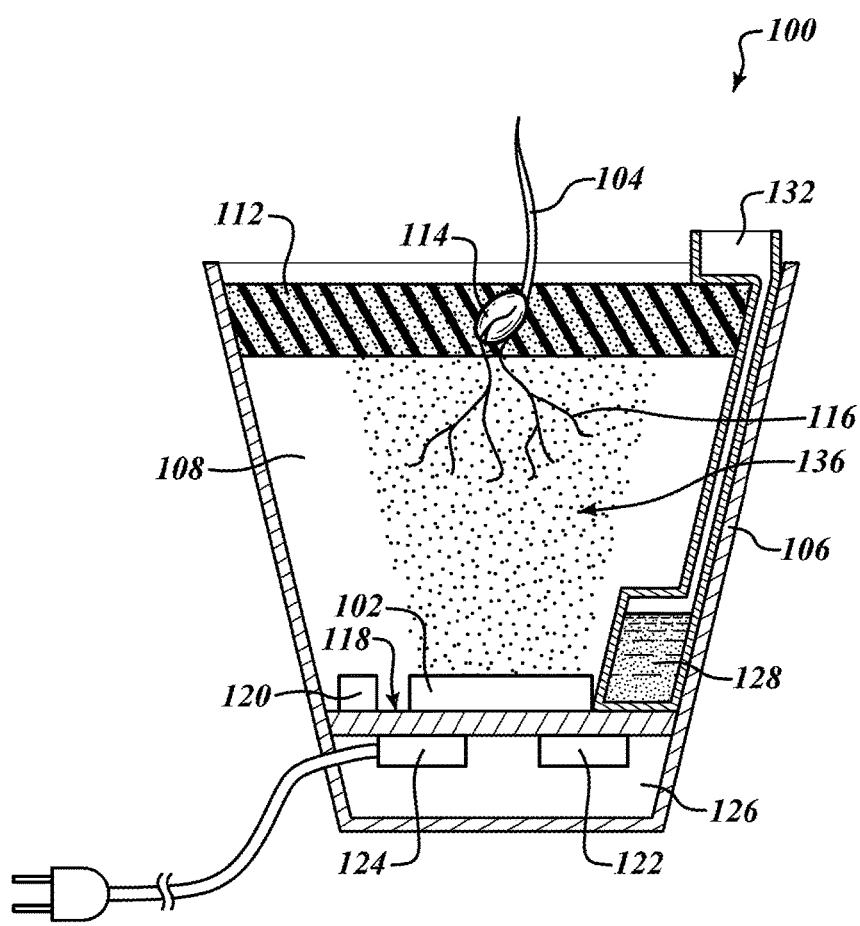

FIGS. 1-3 are views of an aeroponics system 100 that includes a microfluidic delivery member 102 at different stages of growth of a plant 104 according to an embodiment of the present disclosure. The system 100 includes a container 106. The container 106 supports one or more plants 104 and includes a root growth area 108. The growth area 108 is separated from an environment 110 by a supportive seal 112. The environment includes an area in which upper portions of the plant 104, such as leaves and stems, extends.

As shown in FIGS. 1-3, the plant 104 begins as a seed 114. The seed 114 is suspended or otherwise supported in the seal 112. The seal 112 may be a porous sponge-like material or may include rigid support elements, such as in a grid form. Alternatively, the plant 104 may already include roots 116 when placed in the seal 112. The seal 112 supports the plant 104 in a vertical position so that the roots 116 are suspended in the growth area 108 and the upper portions extend into the environment 110. The environment 110 may be a user's home or could be in a managed greenhouse environment. The system can be inverted such that the root ball is positioned above the leaves and stems.

The user may begin with a single seed 114 supported in the seal 112. The seal 112 separates the environment 110 from the root growth area 108. It can be advantageous to keep particulates and other matter away from the roots. The seal 112 may include a bacterial filter to prevent unwanted bacteria from entering the root growth area 108 from the environment 110.

The microfluidic delivery member 102 is positioned on a bottom surface 118 of the container 106. Nozzles (not shown) face the growth area 108 and are configured to provided water and nutrients to the roots 116. Utilizing the microfluidic delivery member, such as inkjet print-head technology, gives a user control over drop size and timing. As different plants require different amounts of water and nutrients, this system allows the user to control the timing and size of droplets of water or nutrients. Deterrents, such as pesticides, or other health stabilizers can also be dispensed. In particular, microfluidic die can create very small droplets that allow for easier absorption of the dispensed fluid. Discrete drop control is achievable as well. Using thermal or piezo technology in the microfluidic die can allow for delivery of one drop or trillions of drops such that the system can dispense one Pico liter or one liter based on the needs of the system.

The system 100 is adaptable to include sensors 120. The sensors detect temperature, humidity, pressure, oxygen levels, carbon dioxide levels, light, or any number of environmental parameters that affect the plant's growth. The system 100 also includes a controller 122. The controller 122 is coupled to the sensors 120 and to the microfluidic delivery member 102. The controller 122 controls the rate of output of the microfluidic delivery member 102. The controller 122 is configured to control a drop size, for example by selecting a particular heating cycle for heaters (or ejection cycle if piezo technology is utilized) positioned in a substrate of a microfluidic die on the microfluidic delivery member. The controller 122 is configurable to adjust to a viscosity of the fluid being ejected. For example, water has a different viscosity than a nutrient water combination or a nutrient only fluid. The rate of ejection of fluid can be adjusted to be optimal for the specific type of plant being grown or for the specific stage of growth of the plant. For example, some plants require a different type of nutrient when preparing to flower or produce fruit as opposed to a more dormant phase of the plant's growth. This system may include a real-time clock that tracks the age of the plant. For example, how many days, hours, minutes a plant has been alive. The clock may track from first root breaking through the seed or first leaf, etc.

The controller 122 receives environmental parameter signals from the sensors 120. In some embodiments, the controller processes these environmental parameter signals from the sensors and determines how much water and nutrients to provide to the roots 116 via the microfluidic delivery member 102. The controller may include a transceiver that transmits information to a user that is remote from the system. The controller is configured to interact with the Internet of Things, such that the controller can interact with adjacent aeroponics systems in a greenhouse and can provide data and receive input from a remote user. For example, if each container 106 has an associated light sensor, a network controller can receive and determine an average light intensity in the greenhouse. The user may evaluate such data based on the environmental parameters and provide instructions to the network controller regarding how to adjust internal lighting systems or adjust shade providing panels for a system that uses sunlight. The user can also indicate an amount of water and nutrients to provide to the different roots of the different plants of the system. In particular, the user may provide instructions regarding duration, droplet size, and an amount of a specific nutrient to provide. The droplet size is affected by a nozzle size, such as 5-50 micrometers in diameter, with high pressure to ensure interaction of the fluid with the root ball. Another benefit is the control of the number of drops ejected per a time period. This system allows for precise control of a volume of liquid ejected. For example, 1 pico liter to 35 pico liters per second or other selected time period.

A power supply 124 is positioned adjacent to the controller 122 in a dry area 126. The power supply 124 provides power to the whole system 100 through connections (not shown). A reservoir 128 is coupled to the container 106. In FIG. 1, the reservoir 128 is positioned within the growth area 108, however, the reservoir 128 may be positioned on an outer wall 130 of the container or be spaced from the container, being coupled by a pipe or tube.

In FIGS. 1-3, the reservoir 128 includes an opening 132 through which fluid is provided by a user. The fluid may be water only, may be a nutrient only, or may be a combination of water and nutrients. A fluidic connection (not shown) moves the fluid to the microfluidic delivery member 102 for distribution into the growth area 108. The fluidic connection is controllable by the controller 122.

The sensors 120 can include a camera or other detection mechanism that is configured to determine when a root begins to protrude from the seed. The seed has different nutrient and water requirements as compared to the full root ball 116. The sensors 120 are configured to gather information in the root growth area 108 to the controller 122. The controller 122 processes the information and either controls the microfluidic delivery member 102 and the reservoir 128 to meet the needs of the plant or the controller 122 transmits the information to the user, giving the user the opportunity to adjust settings of the system.

A nutrient block 134 is illustrated in FIG. 2. This nutrient block may be selected to provide nutrients for the type of seed selected to be grown in the system. The nutrient block 134 may be a slow release block that releases portions of the nutrients into water placed in the reservoir 128.

In FIG. 3, a mist pattern 136 exits the microfluidic delivery member 102 vertically towards the roots 116. A size of the droplets in the mist pattern is controllable by the user or programmable in advance. In addition, the microfluidic delivery member 102 may be replaceable, such that if the user opts to grow a different plant with a different mist pattern 136, the microfluidic delivery member 102 may be exchanged for a version of the microfluidic delivery member that includes the droplet size and other beneficial features for the new growth plan. The mist patterns can be different for each microfluidic delivery member. In addition, each can have a different flow rate.

Figure 4A:
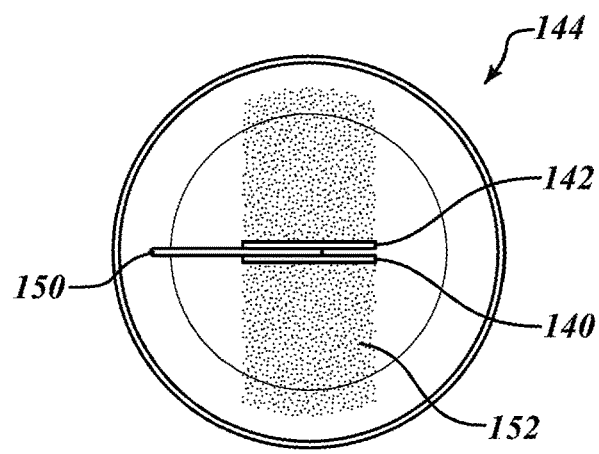
FIGS. 4A-4B are views of an aeroponics system including a plurality of microfluidic die centrally positioned within a container according to an embodiment of the present disclosure.
Figure 4B:
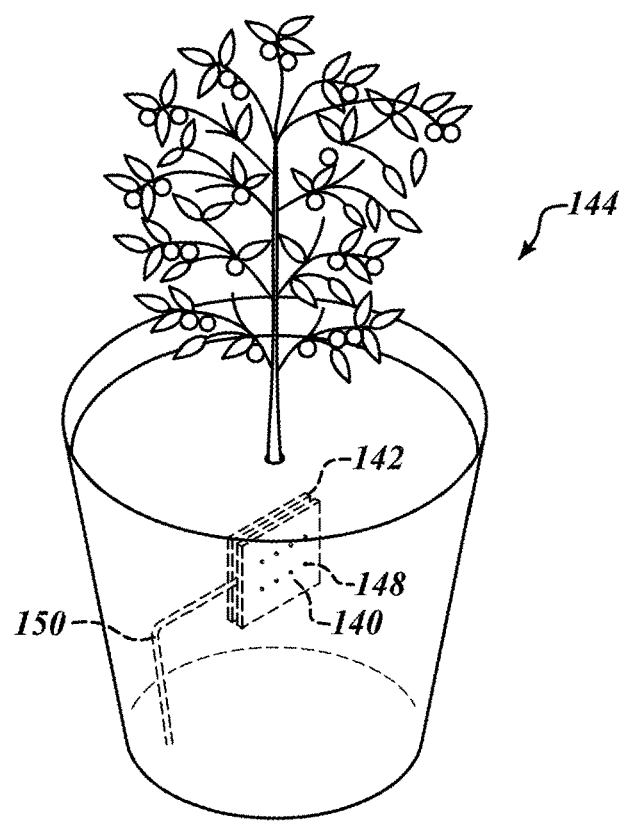

FIGS. 4A and 4B are top and perspective views of an arrangement of first and second microfluidic delivery members 140, 142 positioned centrally in an aeroponics system 144. The first and second microfluidic delivery members 140, 142 include a microfluidic die with nozzles 148. The microfluidic die may be included on a printed circuitry board, see FIGS. 7A, 7B for more details.

The nozzles 148 face away from the second microfluidic delivery member 142. The second microfluidic delivery member 142 also includes nozzles that face the opposite direction from the nozzles 148 of the first microfluidic delivery member 140. Each of the first and second microfluidic members 140, 142 includes an inlet that receives fluid from pipe or other fluid transport 150.

The first and second microfluidic delivery members 140, 142 are suspended centrally to provide a mist pattern 152 horizontally. The fluid transport 150 may include rigid features that provide mechanical support for the first and second microfluidic delivery members 140, 142. The support can be adjusted to accommodate a size and shape of a root ball. For example, if the root ball becomes to large or is overlapping the microfluidic delivery member such that the nozzles are blocked or partially blocked, the support can be adjusted in a vertical direction to move the microfluidic delivery member. The support is also rotatable around a base to allow for adjustment to the left and right of the center of the system.

The fluid transport 150 may also provide electrical connections to the controller. The first and second microfluidic delivery member 140, 142 can be in separate packages or may be included in a single package. The single package may be a plug and play arrangement that allows delivery members with different nozzle and chamber designs to be easily replaced or exchanged in the system, depending on the user's intended use. For example, different designs are configured for different fluids such that the plug and play arrangement may be directed to nutrient delivery.

Figure 5A:
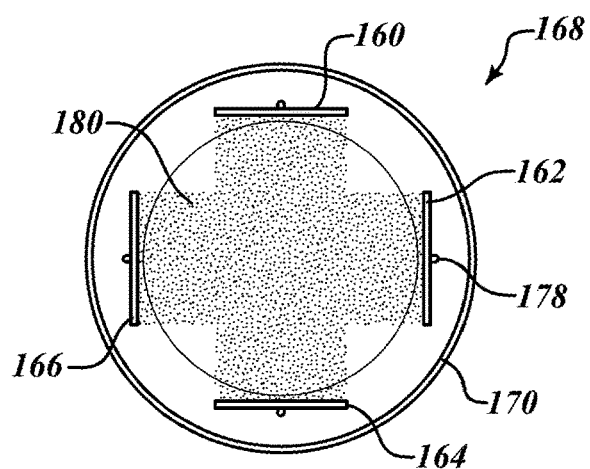
FIGS. 5A-5B are views of an aeroponics system including a plurality of microfluidic die positioned on an interior wall of a container according to an embodiment of the present disclosure.
Figure 5B:
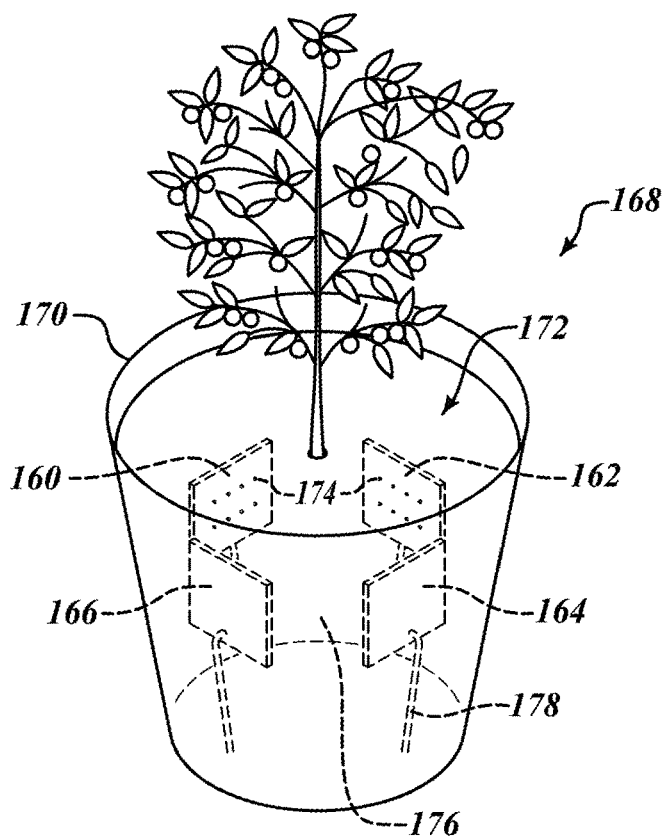

FIGS. 5A and 5B are top and perspective views that include four microfluidic delivery members 160, 162, 164, 166 in an aeroponics system 168. The system 168 includes a container 170 with the microfluidic delivery member attached to an interior wall 172 of the container 170. The delivery member includes nozzles 174 that face an interior growth area 176. The interior wall 172 may include features to secure the delivery member to the wall. Alternatively, a fluid transport 178 may provide mechanical support to hold the delivery member in place in the growth area 176.

The fluid transport 178 provides water and nutrients on demand or on a schedule. The transport may also provide electrical signals to the delivery member to control a mist pattern 180. Each of the delivery member can be controlled simultaneously to create the plus shaped mist patter 180 shown in FIG. 5A. Alternatively, the delivery member can be activated and deactivated in a pattern such that not all of the delivery members are dispensing fluid at the same time.

In this system, a die may be dedicated to a specific fluid, to eject one fluid. The fluid can be a pure, single fluid, like water, or could be a combination fluid, such as water with a nutrient. Alternatively, the die can receive multiple fluids and some nozzles expel one fluid while other nozzles of the same die expel a different fluid.

In some embodiments, the transport 178 for one delivery member, such as the first delivery member 164 may transport a different fluid than the transport for the second delivery member 166. For example, the first delivery member 164 may receive deionized water, while the second delivery member 166 receives a nutrient rich fluid.

Figure 6A:
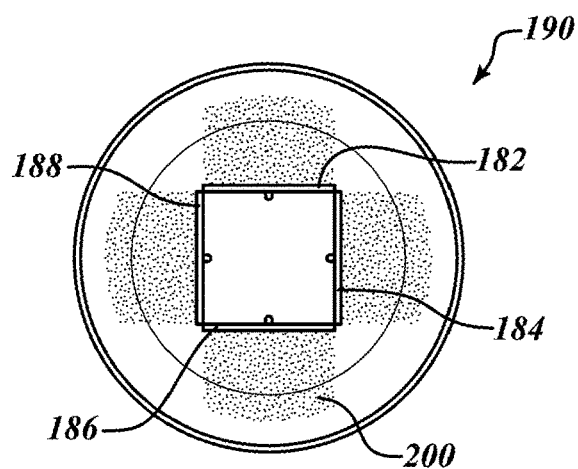
FIGS. 6A-6B are views of an aeroponics system including a plurality of microfluidic die centrally positioned within a container according to an alternative embodiment of the present disclosure.
Figure 6B:
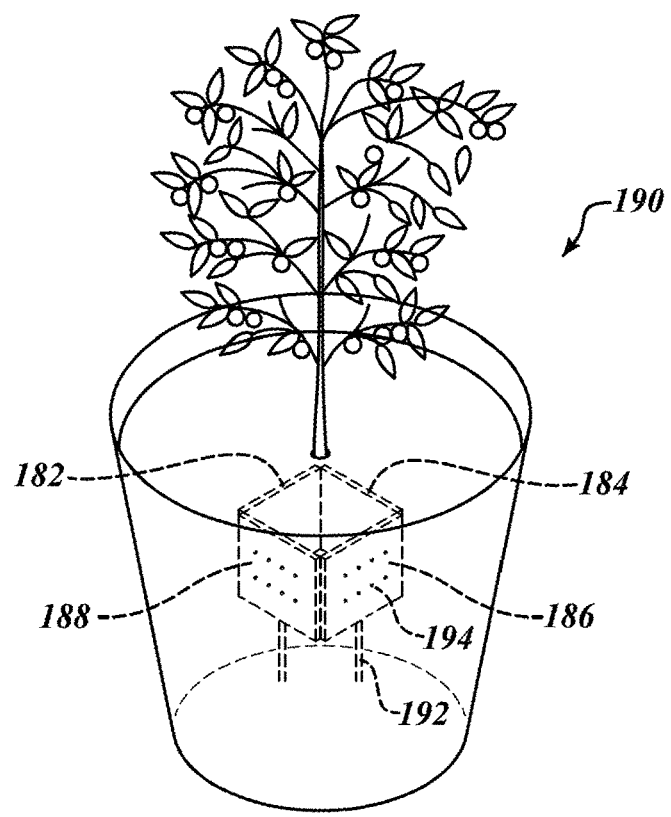

FIGS. 6A and 6B are top and perspective views of four microfluidic delivery member 182, 184, 186, 188 positioned within an aeroponics system 190. Each delivery member may have a separate fluid transport 192 or may share a single fluid transport. A fluid distribution pattern 200 extends away from nozzles 194 on each delivery member. The delivery members may be operated simultaneously or in a pattern.

Figure 7A:
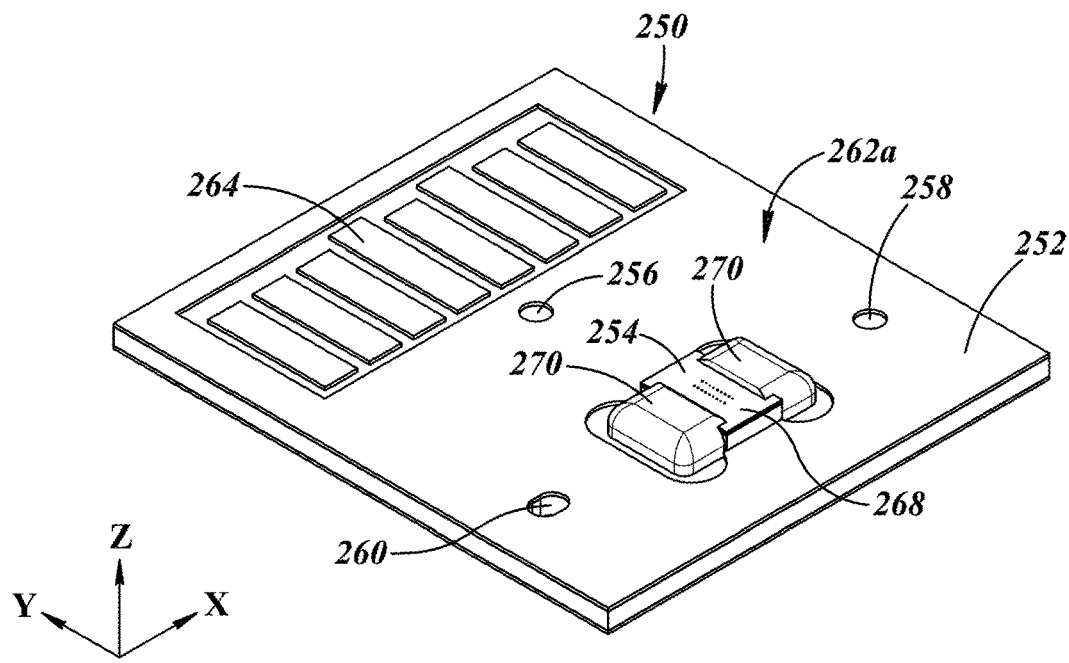
FIGS. 7A-7B are a top and bottom views of a printed circuit board including a microfluidic die for inclusion in an aeroponics system.
Figure 7B:
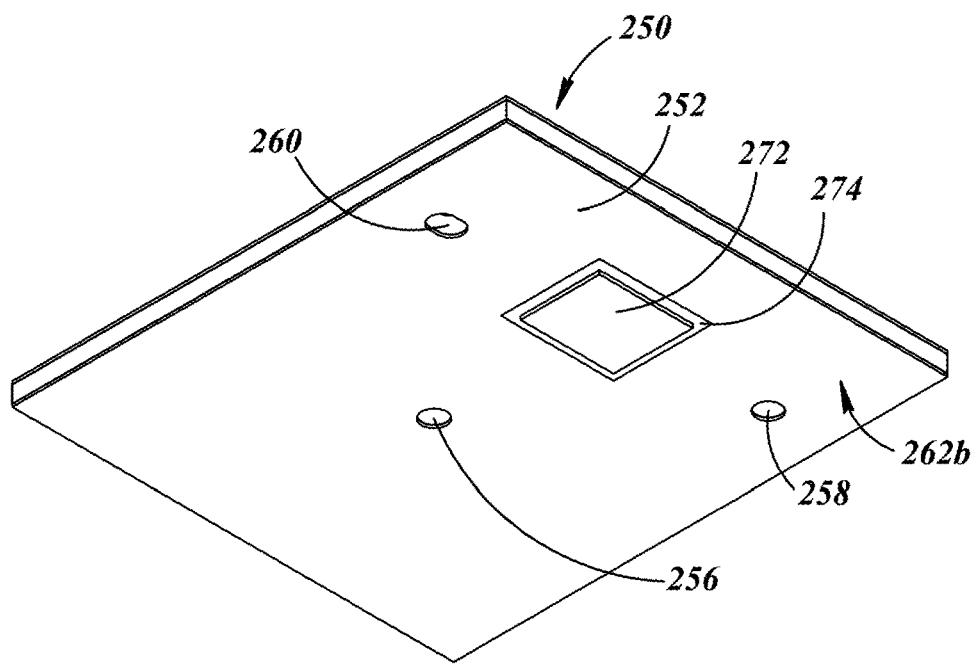

FIGS. 7A and 7B are a top perspective and a bottom perspective view of a microfluidic delivery member 250 for inclusion in an aeroponics system according to an embodiment of the present disclosure. The delivery member 250 includes a printed circuit board 252 that carries a semiconductor die 254. The printed circuit board 252 includes first and second circular openings 256, 258 and an oval opening 260. A container in the aeroponics systems according to embodiments of the present disclosure may include prongs that are configured to interact with the openings 256, 258, 260 to hold the microfluidic delivery member 250 in place. The openings 256, 258, 260 may be other shapes and sizes depending on how the delivery member is secured to walls or supports in the aeroponics system. In some embodiments, the openings can be eliminated. For example, see the embodiments in FIGS. 9 and 12. The openings have different shapes so that the delivery member cannot be positioned into the system incorrectly. Upper and lower surfaces of the board may be coated with a solder mask 262a, 262b. Openings in the solder mask 262 may be provided where contact pads of the die 254 are positioned on the circuit board 252 or where contacts 264 are formed. The solder mask 262a, b may be used as a protective layer to cover electrical connections (not shown) carried by the board 252 that couple the contact pads of the die 254 to the electrical contacts 264, which couple the contact pads to an external power source.

The printed circuit board 252 (PCB) is a rigid planar circuit board, having the upper and lower surfaces. The circuit board 252 includes one or more layers of insulative and conductive materials. In one embodiment, the board includes a FR4 PCB, a composite material composed of woven fiberglass with an epoxy resin binder that is flame resistant. In other embodiments, the board includes ceramic, glass or plastic.

The circuit board 252 includes all electrical connections on the upper surface of the board 252. The die 254 is also included on the upper surface, such that nozzles 268 face away from the upper surface. This allows nozzles 268 to eject the fluid directly away from the printed circuit board. This die is configured to eject fluid is a variety of droplets sizes and mist patterns. For example, the die may eject a mist plume 5-10 cm away from the board.

Figure 8A:
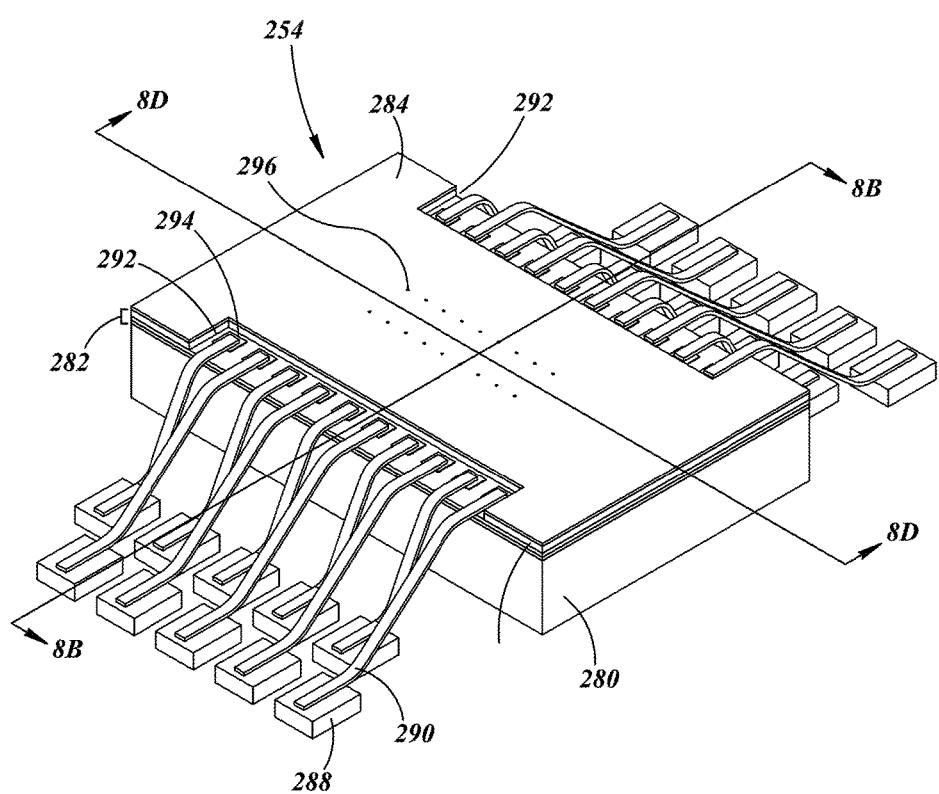
FIGS. 8A-8E are views of the microfluidic die of FIG. 7A.

The die 254 includes a plurality of leads coupled to contact pads on the board, see FIG. 8A for more details. The leads and contact pads are covered by an insulating material 270.

An area of a top surface of the die may be closer in size to the upper surface of the board. The size and shape of the board is adjustable depending on how the board will be attached in the container of the aeroponics system. On the lower surface of the board, a filter 272 may be provided between an input of the die and a fluid transport that carries fluid from a reservoir into the die for distribution. The filter 272 is configured to prevent at least some of the particles from passing through the opening to prevent clogging of the nozzles 268 of the die 254. In some embodiments, the filter 272 is configured to block particles that are greater than one third of the diameter of the nozzles 268. It is to be appreciated that in some embodiments, the fluid transport can act as a suitable filter, so that a separate filter is not needed. In one embodiment, the filter 272 is a stainless steel mesh. In other embodiments, the filter 272 is randomly weaved mesh, polypropylene or silicon based. The filtration size is around one half of the size of the nozzle of the die, meaning particles of x size and larger are filtered for nozzles 2x in size.

The filter 272 is attached to the lower surface with an adhesive material 274. The adhesive material 274 may be an adhesive material that does not readily dissolve by the fluid in the reservoir.

The board includes an opening (not shown) over which the die 254 is positioned. The filter 272 covers the other side of the opening. In alternative embodiments, the fluid transport may be attached to an end of the board such that the board has a channel from the fluid transport to the die to provide fluid to chambers of the die.

The semiconductor die 254 is secured to the upper surface of the board above the opening. The semiconductor die 254 is secured to the upper surface of the board by any adhesive material configured to hold the semiconductor die to the board. The adhesive material may be the same or different from the adhesive material used to secure the filter 272 to the microfluidic delivery member 250.

Different nutrients to be provided in the aeroponics systems have different chemical properties than typical ink used with inkjet printers. Microfluidic die were originally designed for use in inkjet printers. Recent developments in manufacturing and controlling allow these microfluidic die to be utilized in a variety of systems. Typical inkjet print heads use very expensive, very specific materials to prevent the ink from damaging the components that support the ink ejection process, such as the reservoir. In the present disclosure, common materials, such as an FR4 board can be utilized to create a sophisticated, but cost effective system. A liner (not shown) may be included to line the opening through which the fluid passes to the die. The liner provides a protective coating to allow the cost effective board to be utilized in this system without damage from the various nutrients that may be ejected by the die. In one embodiment, the liner is gold, however, in other embodiments the liner may be silicon nitride, other oxides, silicon carbide, and other metals, such as tantalum or aluminum, or a plastic, such as PET.

Figure 8B:
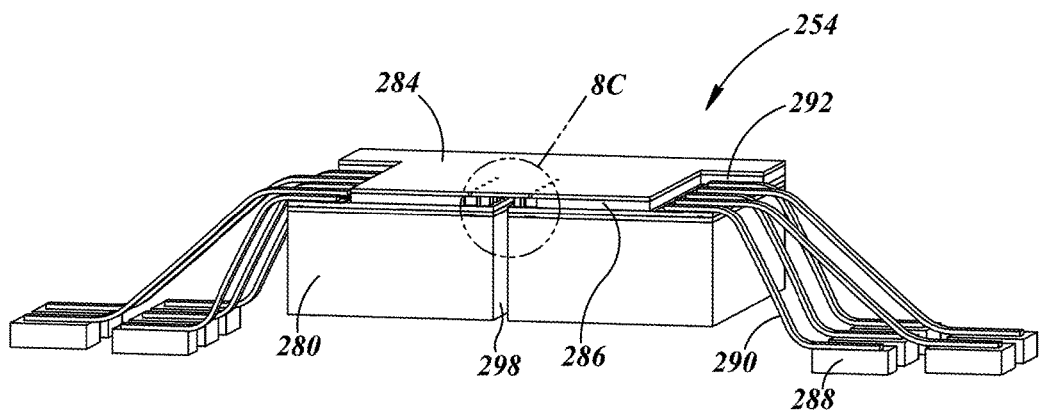
Figure 8C:
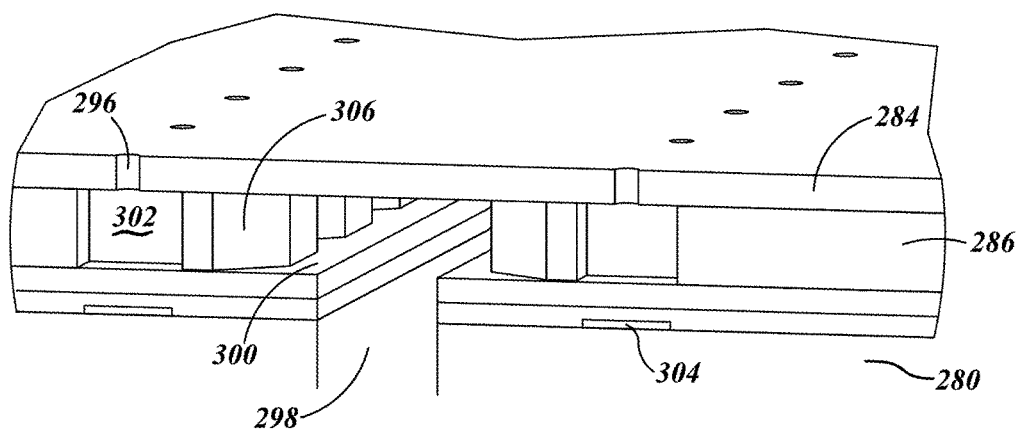
Figure 8D:
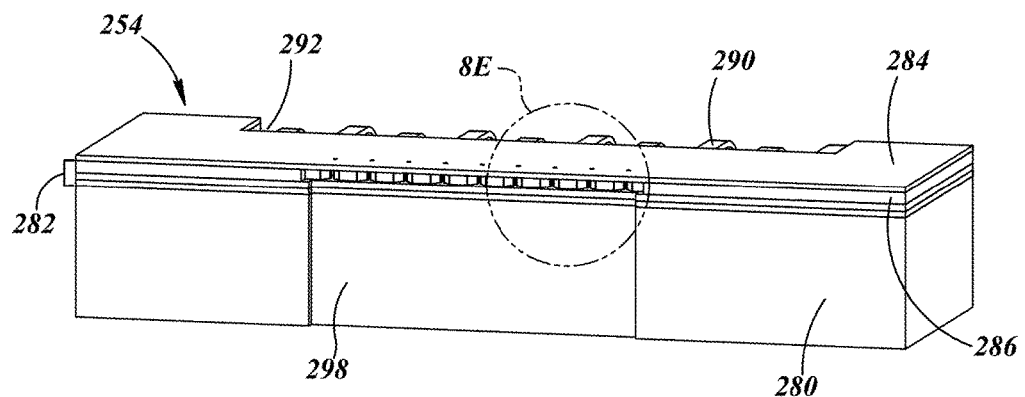
Figure 8E:
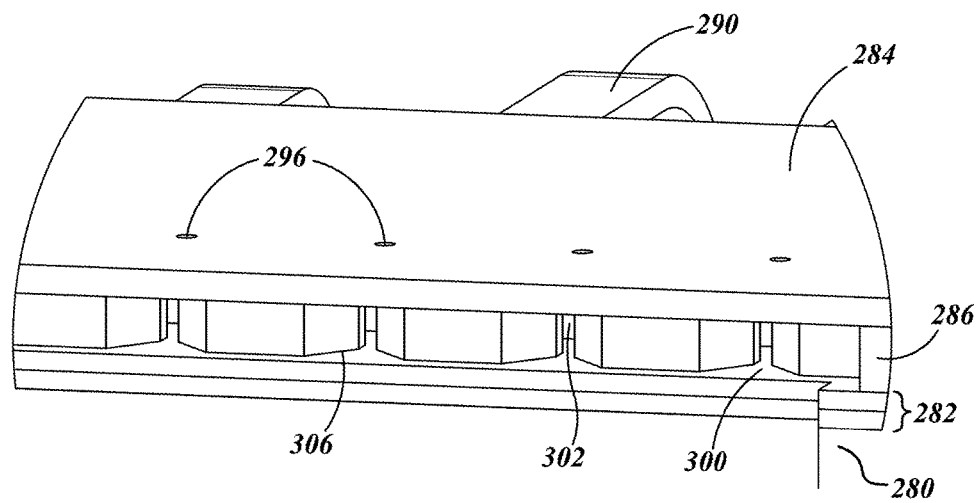

FIGS. 8A-8E each includes more details of the microfluidic die 254. The microfluidic die 254 includes a substrate 280, a plurality of intermediate layers 282, and a nozzle plate 284. The plurality of intermediate layers 282 includes dielectric layers and a chamber layer 286 that are positioned between the substrate and the nozzle plate. In one embodiment, the nozzle plate is 12 microns thick. The substrate can be silicon, which will not rust or deteriorate in a moist environment. In some embodiments, the silicon may have two or more inlet paths that provide different fluids to the same die, such as water and a nutrient fluid. The die allow for directional, controllable distribution of fluid. FIG. 8B is a cross-section of FIG. 8A through line 8B-8B. FIG. 8D is a cross-section of FIG. 8A through line 8D-8D. FIG. 8C is an enhanced view of a region of FIG. 8B. FIG. 8E is an enhanced view of a region of FIG. 8D.

The die 254 includes a plurality of electrical connection leads 290 that extend from one of the intermediate dielectric layers 282 down to the contact pads 288 on the circuit board 250. Each lead couples to a single contact pad. Openings 292 on the left and right side of the die provide access to the intermediate layers 282 to which the leads are coupled. The openings 292 pass through the nozzle plate 284 and chamber layer 286 to expose contact pads 294 that are formed on the intermediate dielectric layers. In other embodiments, there may be one opening 292 positioned on only one side of the die such that all of the leads that extend from the die extend from one side while other side remains unencumbered by the leads.

In the illustrated embodiment, there are 18 nozzles 296 through the nozzle plate 284, nine nozzles on each side of a center line. In some embodiments, the nozzle has a diameter between 20-30 microns. Each nozzle is in fluid communication with the fluid transport and the reservoir in the aeroponics system. The die 254 includes an inlet path 298 that passes completely through the substrate 280 and interacts with the chamber layer 286 and the nozzle plate 284. The inlet path 298 is a rectangular opening, however, other shapes may be utilized according to the flow path constraints. The inlet path 298 is in fluid communication with the fluid path that passes through the opening of the board.

The inlet path 298 is coupled to a channel 300 that is in fluid communication with individual chambers 302, forming the fluid path, see FIG. 8C. Above the chambers 302 is the nozzle plate 284 that includes the plurality of nozzles 296. Each nozzle 296 is above a respective one of the chambers 302. The die 254 may have any number of chambers and nozzles, including only one chamber and nozzle pair. In the illustrated embodiment, the die includes 18 chambers each associated with a respective nozzle. Alternatively, it can have ten nozzles and two chambers provided fluid for a group of five nozzles. It is not necessary to have a one-to-one correspondence between the chambers and nozzles.

Proximate each nozzle chamber is a heating element 304 that is electrically coupled to and activated by an electrical signal being provided by one of the contact pads 294 of the die 254. Each heating element 304 is coupled to a first contact and a second contact. The first contact is coupled to a respective one of the contact pads on the die by a conductive trace. The second contact is coupled to a ground line. In one embodiment, there is only a single ground line that is shared by contacts on both sides of the die.

In use, when the fluid in each of the chambers 302 is heated by the heating element 304, the fluid vaporizes to create a bubble. The expansion that creates the bubble causes fluid to eject from the nozzle 296 and to form a droplet.

The microfluidic die may eject the fluid using heaters, such as the heating elements 304. These heating elements are used in thermal inkjet print heads. Alternatively, the microfluidic die may eject fluid using piezoelectric components.

As mentioned above, the substrate 280 includes the inlet path 298 through a center region associated with the chambers 303 and the nozzles 296. The inlet path is configured to allow fluid to flow up from a bottom surface of the die into the channels which couple to the nozzle chambers and heat the fluid to be ejected out of the nozzles.

The chamber layer 286 defines angled funnel paths 306 that feed the fluid from the channel 300 into the chamber 302, see FIG. 8E. The chamber layer 286 is positioned on top of the intermediate dielectric layers 282. The chamber layer defines the boundaries of the channels and the plurality of chambers associated with each nozzle. In one embodiment, the chamber layer is formed separately in a mold and then attached to the substrate. In other embodiments, the chamber layer is formed by depositing, masking, and etching layers on top of the substrate.

The enhanced view of FIG. 8E includes four nozzles formed in the nozzle plate, which are associated with four chambers positioned under each nozzle. The channel feeds fluid into each chamber through the funnel path. The inlet can be seen extending from the bottom surface of the die up to the channel. The inlet, as described above, allows fluid to flow from an external device, such as the reservoir of the aeroponics system described above. The inlet is in fluid communication with the channels and with the chambers, which are configured to eject the fluid through the nozzles in use.

Figure 9:
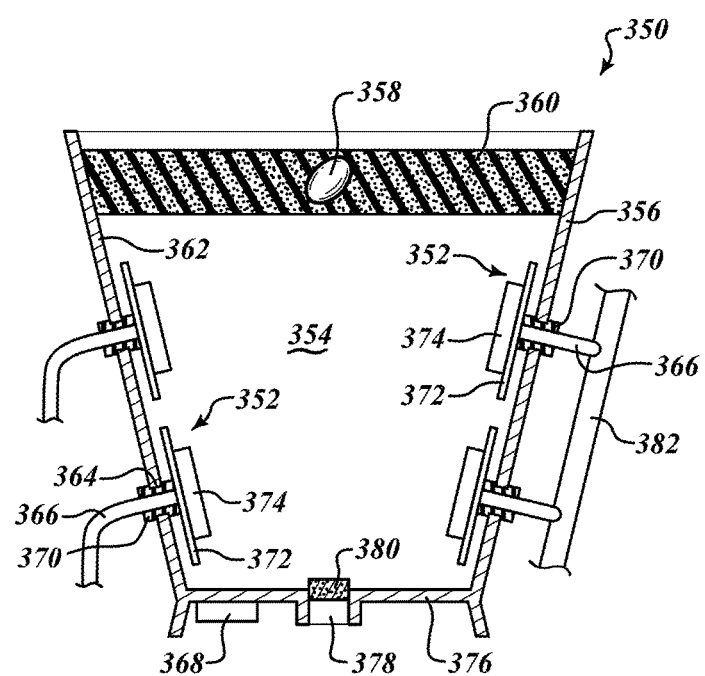
FIG. 9 is a side view of an aeroponics system that includes a plurality of microfluidic die according to an alternative embodiment of the present disclosure.

FIG. 9 is a cross-sectional view of an embodiment of an aeroponics system 350 according to the present disclosure that includes a plurality of microfluidic delivery members 352 positioned in an interior area 354 of a container 356. The container 356 may support a single plant or a plurality of plants. A single seed 358 is provided for illustrative purposes. The seed 358 is supported in a structural layer 360 that fits securely within the interior of the container. There may be a ledge or other support feature that the structural layer 360 rests on. Alternatively, the structural layer 360 may be a material that is compressible for insertion into the container and expandable in a normal state, which will provide pressure to an interior wall 362 of the container 356 to maintain the structural layer 360 in place.

The structural layer 360 seals the interior area 354 to create a closed growth area for the roots of the plant. The structural layer 360 may block light or may allow some light from the environment to pass into the interior area. This container 356 includes openings 364 in the wall 362. These openings 364 allow fluid transport piping or tubing 366 to couple to a backside of the microfluidic delivery members 352. Electrical connections that couple the microfluidic delivery members 352 to a controller 368 and a power source may also travel along the fluid transport piping 366.

Plug material 370 can be included to provide a water tight and air tight seal around the fluid transport piping 366.

Each microfluidic delivery member 352 includes a printed circuit board 372 and a microfluidic die 374. In some embodiments, sensors may be positioned adjacent to the microfluidic die 374 on the printed circuit board 372, see FIG. 11.

The container 356 includes a bottom 376 that includes a drain 378. The bottom 376 may be angled to allow excess water and fluid to more easily exit the interior area 354. A filter 380 can be included in the drain to prevent larger particles from passing through the drain. The filter 380 is included in circumstances where the water and fluid is recycled through that system.

The two microfluidic delivery members 352 on the right side of the container in FIG. 9 are both coupled to a single fluid transport member 382, which may be coupled to a fluid reservoir (not shown). In one embodiment, the two right side microfluidic delivery members 352 will distribute water into the system while the two left side microfluidic delivery members 352 will distribute different nutrients into the system. The two left side microfluidic delivery members 352 may provide different nutrients at different rates as is beneficial to the plant and programmed by the user. Valves may be included and controlled by the controller to allow different fluids to be provided to the various fluid transport members.

Figure 10:
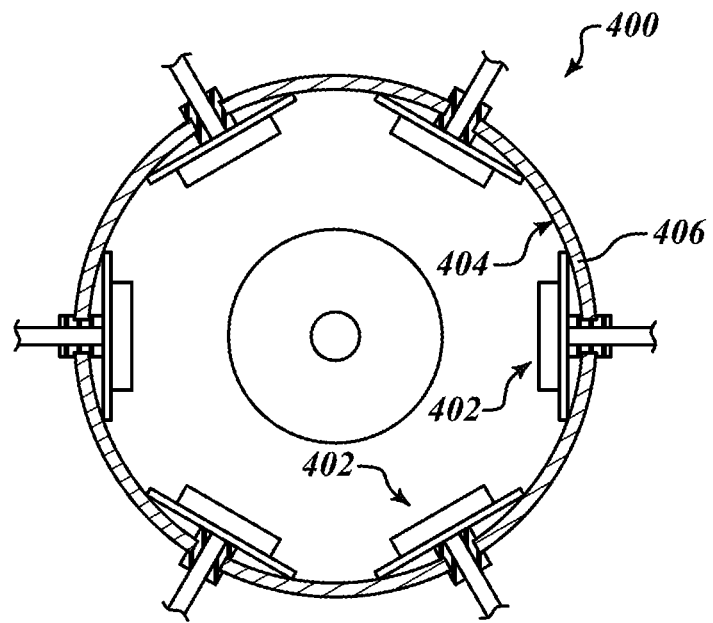
FIG. 10 is a top down view of an aeroponics system that includes a plurality of microfluidic die according to an alternative embodiment of the present disclosure.

FIG. 10 is a top down view of an aeroponics system 400 that includes microfluidic delivery members 402 affixed to an interior wall 404 of a container 406. The microfluidic delivery members 402 may be of the plug-and-play variety such that each one is easily replaceable. Different delivery members may be selected that have different nozzle shapes and sizes and that allow for different distribution patterns of the fluid they are to eject. For example, the user may select three microfluidic delivery members configures to eject water in a specified mist pattern and may select three microfluidic delivery members that are configured to eject a nutrient fluid. The nutrient fluid may have a different viscosity than the water and control of the ejection of each fluid may be optimized by selecting a particular die configuration.

Figure 11:
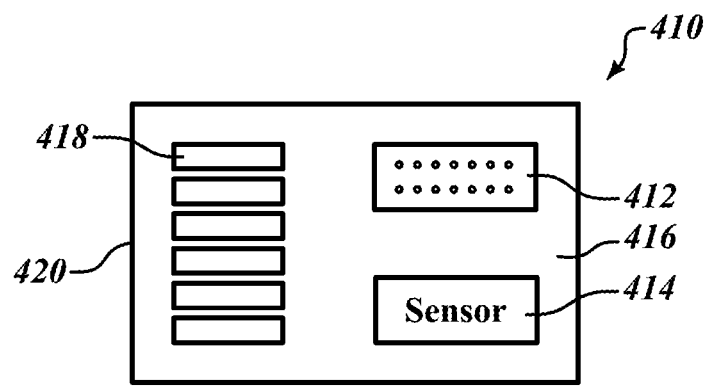
FIG. 11 is a printed circuit board including a microfluidic die and a sensor according to an embodiment of the present disclosure.

FIG. 11 is a microfluidic delivery member 410 according to an embodiment of the present disclosure. This and variations of this microfluidic delivery member may be included in the various embodiments described in this disclosure. The microfluidic delivery member 410 includes at least one microfluidic die 412. One or more sensors 414 are positioned next to the microfluidic die 412 on a printed circuit board 416.

The printed circuit board 416 includes a plurality of contacts 418 at a first end 420 spaced from the die 412 and the sensor 414. Electrical connections pass through the board to the die and the sensor to transmit and receive signals from these devices. The sensor may detect light, moisture, pressure, temperature, or other environmental parameter to be monitored for plant growth.

Figure 12:
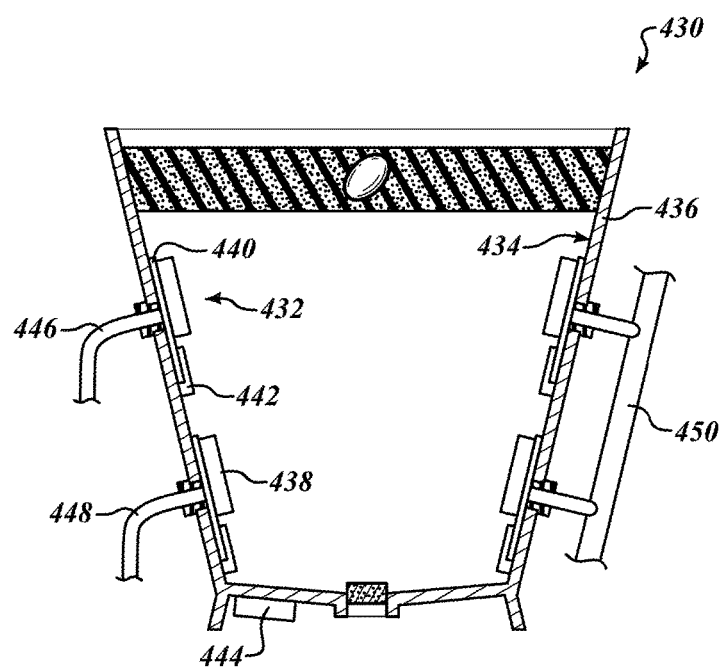
FIG. 12 is a side view of an aeroponics system that includes a plurality of microfluidic die according to an alternative embodiment of the present disclosure.

FIG. 12 is an alternative embodiment of an aeroponics system 430 that includes a plurality of microfluidic delivery members 432 positioned flush with an interior wall 434 of a container 436. The delivery members 432 include a device or devices 438, such as microfluidic die and sensors. The devices 438 are attached to a printed circuit board 440 that is received by an electrical support 442. The electrical support 442 extends from the interior wall 434 to receive and hold the printed circuit board in place. Electrical connections from a controller 444 travel through the wall 434 to couple to the electrical support 442 and ultimately receive and transmit signals to and from the microfluidic delivery members 432. The printed circuit boards 440 may include contacts, such as those illustrated in FIG. 11, which can communicate with electrical connections formed on an interior surface of the electrical support 442. The boards and the supports 442 are configured to form a water tight seal to prevent fluid from entering and affecting the electrical connections. Fluid transport members 446, 448, and 450 coupled to a backside of each microfluidic delivery member to provide fluid to the device, such as a microfluidic die.

Figure 13A:
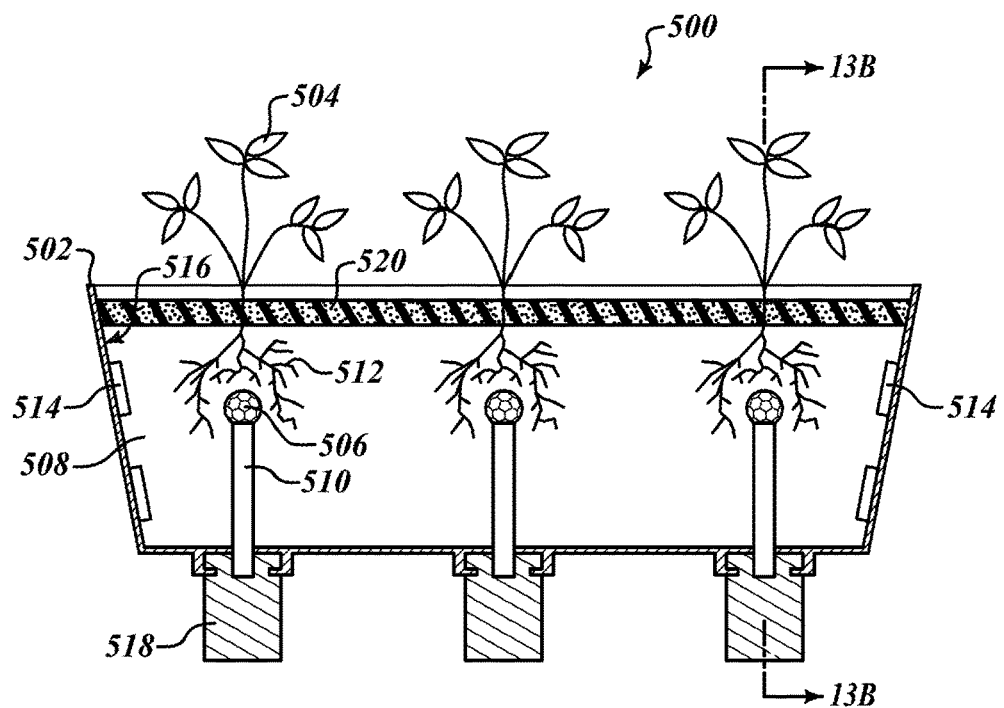
FIGS. 13A-13B are views of an aeroponics system including a plurality of plant support structures and a plurality of microfluidic die.
Figure 13B:
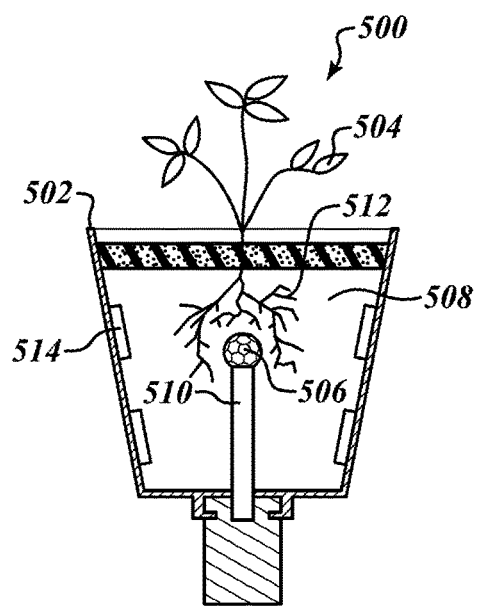

FIGS. 13A and 13B are side views of an aeroponics system 500 according to embodiments of the present disclosure. The system 500 includes a trough or container 502 configured to support a plurality of plants 504 for growth without soil. FIG. 13B is a cross-section view of the container 502 through the line 13B-13B in FIG. 13A. The illustrated embodiment includes a single row of plants and three columns of plants. The container could be larger, such as an array of rows and columns to grow any number of plants.

A plurality of microfluidic delivery members 506 are positioned in a growth area 508 of the container 502. The microfluidic delivery members 506 are positioned beneath a respective one of the plants 504. The delivery members 506 are positioned on supports 510 that are configured to be moved in a vertical direction to allow for adjustment, manually or automatically, based on a size of a root ball 512 of the plant 504.

The system 500 includes a plurality of sensors 514 positioned on an interior wall 516 of the container 502. The sensors 514 are configured to detect a variety of environmental parameters, including, but not limited to light, moisture, humidity, pressure, and proximity of the roots to the microfluidic delivery members. In some embodiments, additional microfluidic delivery members may be included on the interior wall to allow fluid delivery from a central portion of the root ball and from outside of the root ball.

Electrical connections to the plurality of sensors to transmit data and power to and from a power supply and a controller may be positioned within the wall of the container. Alternatively, the sensors may be positioned on a printed circuit board that is configured to snap or plug into the wall. This allows for exchange of the sensor or additional microfluidic delivery members if one fails or if a different environmental parameter is to be detected.

The microfluidic delivery members 506 may receive power and transmit data through the support 510. The support also provides fluid to the delivery members for ejection out of a plurality of microfluidic die on the delivery members 506. See FIGS. 14 and 15 for more details. The support may include a single fluid delivery path to deliver only one type of fluid such as water. The support may include a plurality of fluid delivery paths to carry a variety of fluids to the microfluidic delivery members 506 for ejection of different fluids either simultaneously or at different times.

Mechanical components are included to move the support up and down within the container to accommodate a changing size of the root ball 512. In this embodiment, the sensors provide information to the controller about proximity of the root to the microfluidic delivery member, the controller may communicate this information to a user, who may then determine an amount to adjust the microfluidic delivery member. Alternatively, the controller may automatically adjust the position of the microfluidic delivery members for one or all of the plants. This is a customizable system such that the user can make the system automated, the user can do all adjustments manually, or a combination of some automated tasks and some manual tasks. For example, the user may select that water be provided to the system at set intervals and set the system to inform the user when the root ball is within a set distance from the microfluidic delivery members. The user can program or manually adjust each plant's environment independently or the user can adjust the overall environment in the growth area together. Through the Internet of Things, the user can also adjust an exterior environment that surrounds a leaf and stem portion of the plant.

The microfluidic delivery members may include sensors adjacent to the die, supported beneath the root ball. For example, a proximity sensor could detect with the root ball has grown close to the microfluidic delivery members. The roots could block nozzles on the microfluidic die, impeding delivery of fluid to the roots.

Figure 14:
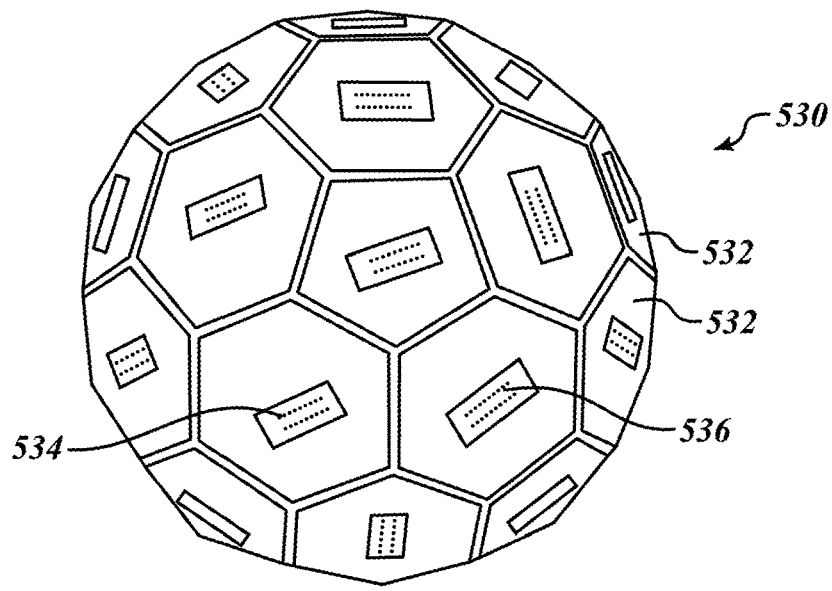
FIG. 14 is an arrangement of a plurality of printed circuit boards and microfluidic die for use in an aeroponics system.

A base 518 provides an area for the support 510 to move into and out of while maintaining a sealed environment to grow the roots. A structural layer 520 supports the plants to allow the roots be suspended in the growth environment. The base 518 may include a reservoir to hold the fluid to be ejected by the microfluidic delivery members 506. Alternatively, the reservoir may be spaced from the container. The base may collect water and nutrients not absorbed by the plant. In some embodiments, the base may be coupled to a filter and a recycling system that reuses or recycles the excess fluid FIG. 14 is an enhanced view of a microfluidic delivery member 530 of FIG. 13A. This microfluidic delivery member may be utilized in conjunction with any of the embodiments described in this disclosure. The microfluidic delivery member 530 includes a plurality of printed circuit boards 532. Each board 532 may include a microfluidic die 534. Alternatively, one of the die may be included on fewer than all of the printed circuit boards, depending on the application. In some embodiments, the printed circuit board may hold a microfluidic die and a sensor. Alternatively, some printed circuit boards may hold a microfluidic die while others hold a sensor 536.

In this embodiment, the printed circuit boards are pentagonal such that when assembled the microfluidic delivery member 530 is similar in shape to a soccer ball. A support, such as the support 510 in FIGS. 13A and 13B can provide power, fluid, and transmit and receive signals from the die and sensors. The printed circuit boards may be provided in a variety of shapes and sizes to meet the specific application. In one embodiment, the support 510 provides fluid and control signals to a back side of each printed circuit board that faces an interior of the microfluidic delivery member.

Figure 15:
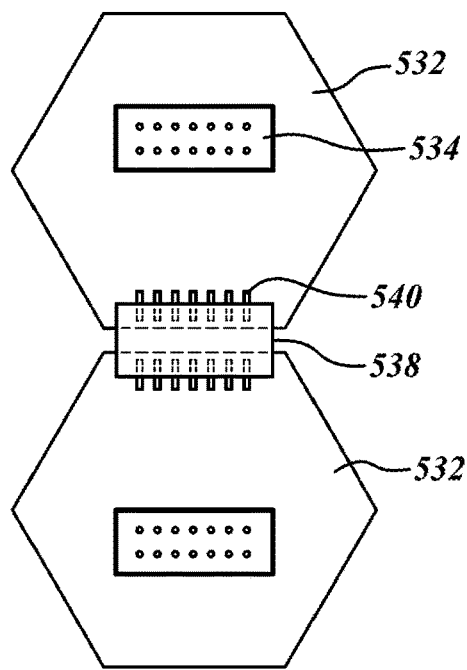
FIG. 15 is an arrangement of printed circuit boards and microfluidic die according to an embodiment of the present disclosure.

FIG. 15 is an alternative embodiment of two printed circuit boards 532 that are electrically and physically coupled together with a bracket 538. The bracket 538 may include electrical contacts internally that are configured to interact with contacts 540 on the printed circuit boards. The contacts 540 allow electrical signals, including control signals regarding how and when to eject fluid from microfluidic die 534 positioned on the boards 532. Electrical connections between the contacts 540 and the die 534 pass through the board (internally within in the board), protected from external elements, such as water. The boards may support and include sensors, such as those described with respect to other embodiments in the present disclosure.

Groups of boards 532 may be coupled together to be controlled together. For example, a cluster or group of the boards 532 that all include microfluidic die configured to eject water may be controlled with a single connection such that all are coupled together and only one receives the control signals. Similarly, an additional group of microfluidic die may be configured to eject nutrients and be controlled by a separate control signal, one that is shared between the nutrient ejecting microfluidic die.

Figure 16:
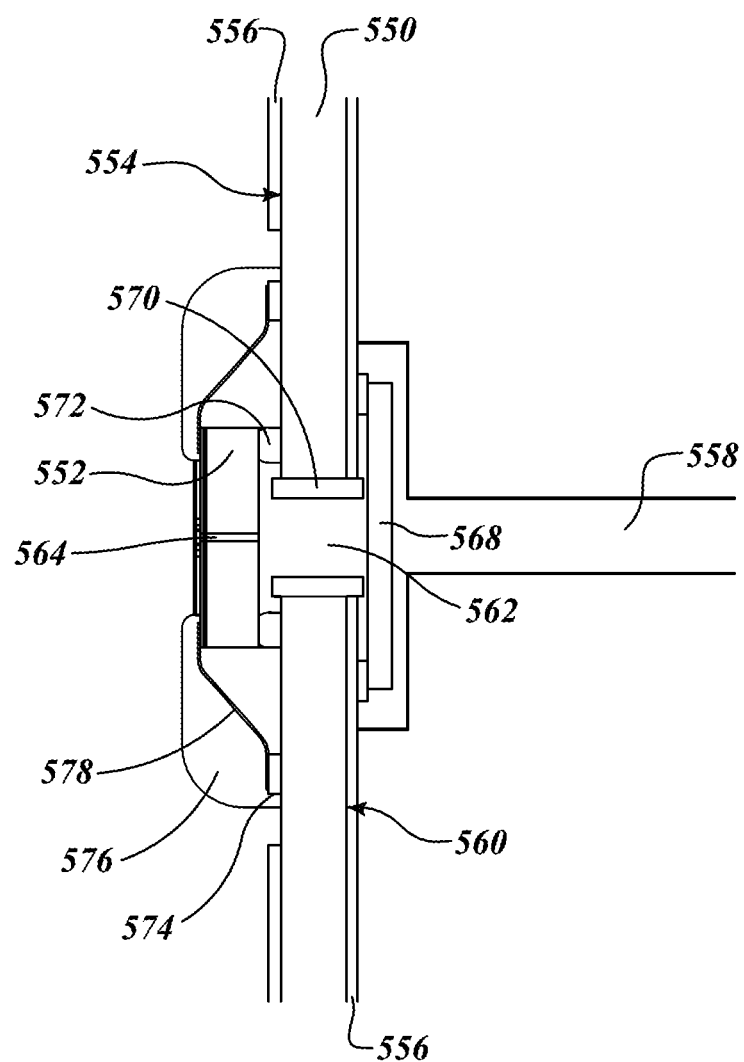
FIG. 16 is a side view of a printed circuit board and a microfluidic die.

FIG. 16 is a side view of a board 550 having a microfluidic die 552 on a first side 554 of the board. The board includes a protective layer 556 that protects electrical traces formed in or on the board. A fluid transport member 558 provides fluid to a second side 560 of the board 550. There is an opening 562 through the board 550 aligned with the fluid transport member 558 to allow fluid to enter an inlet path 564 of the die 552. A filter 568 may be positioned between the fluid transport member and the die. A protective liner 570 protects an exposed surface of the board, exposed by the opening 562. The protective liner 570 may be included when the fluid to be ejected is potentially damaging to the board.

A support 572 separates the die from the first side of the board. Electrical contacts 574 are formed on the board and coupled to the electrical traces in the board that are not shown. An insulting cover 576 covers leads 578 from contacts on the die to the contacts 574 on the board. The support 572 is optional. The die can be directed mounted on the board 550.

Figure 17:
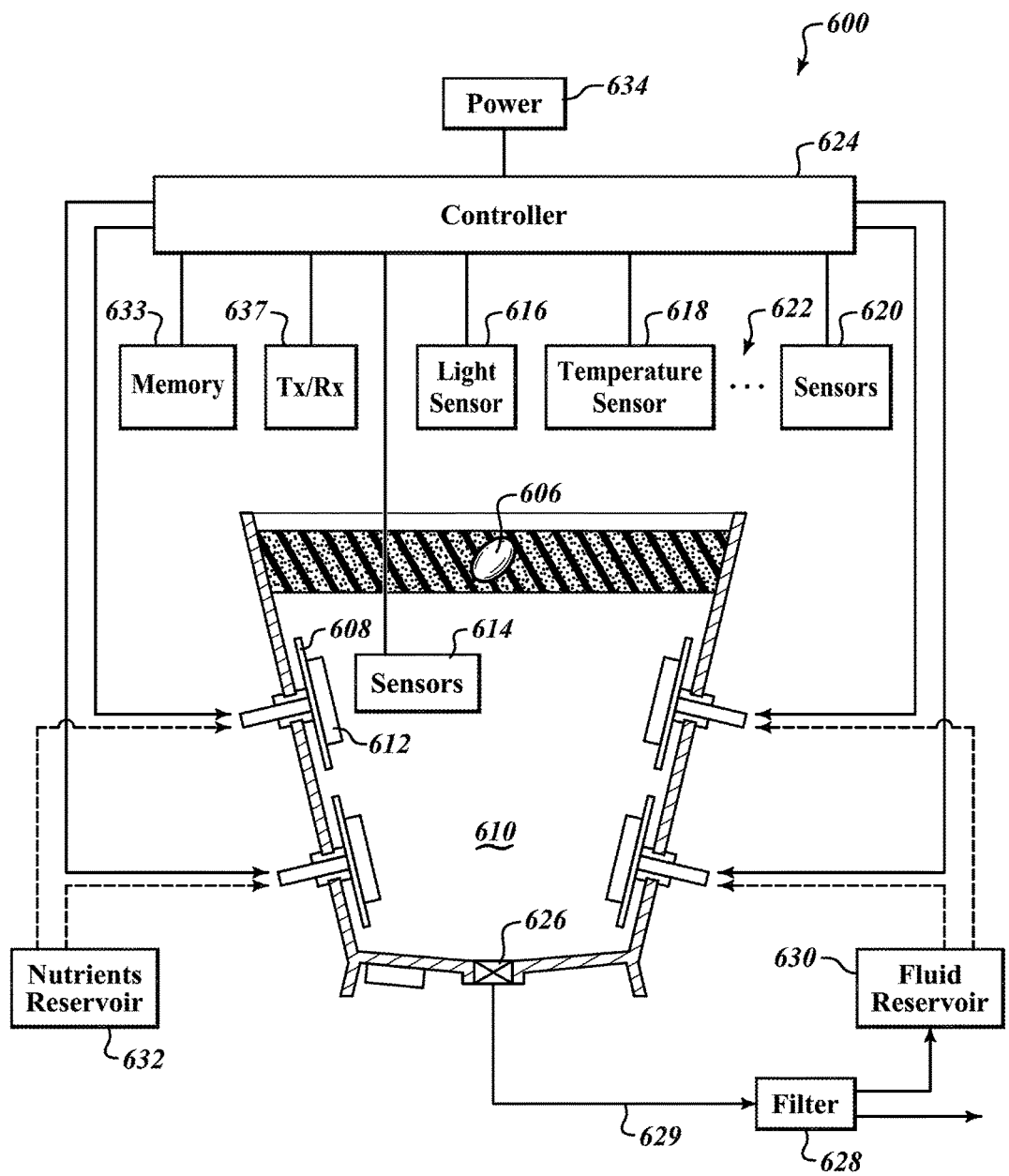
FIG. 17 is an aeroponics system according to an embodiment of the present disclosure.

FIG. 17 is an aeroponics system 600 that includes a container 602 configured to grow a plant. In this illustration, the plant begins from a seed 606, however, a user may begin with an already rooted plant instead of a seed. This container 602 includes a plurality of microfluidic members 608 positioned within an interior area 610. The microfluidic members 608 include microfluidic die 612 that eject fluid into the area 610. The arrangement and position of the microfluidic members 608 may be varied from the illustrated arrangement in accordance with the present disclosure.

A fluid reservoir 630 provides fluid to a subset of the microfluidic members 608 and a nutrient reservoir 632 provides nutrients to other ones of the microfluidic members 608. In some embodiments, both the fluid reservoir 630 and the nutrient reservoir 632 are coupled to each microfluidic member, such that the controller dictates which reservoir provides the material to be ejected from the microfluidic die on the microfluidic member.

Interior environmental sensors 614 are included in the container 602 to detect qualities and quantities within the interior area 602. These interior sensors detect environmental qualities associated with roots of the plant and the growth area 610. Additional exterior sensors, such as light sensors 616, temperature sensors, 618, and other sensors 620 are included in an exterior area 622 that surround an exterior of the container. These exterior sensors detect environmental qualities associated with leaves and stems of the plant.

There is an opening 626 in a bottom of the container 602, which allows fluid to drain from the container after being ejected by the microfluidic members 608. The opening 626 may be coupled to a fluid transport member 629 that moves excess fluid. The excess fluid may be filtered by a filter 628 and returned to a reservoir 630. The system may reduce water or other fluid waste by recycling the fluid back into the system. Alternatively, the filtered fluid may be moved out of the system as waste.

A controller 624 is coupled to each of the interior and exterior sensors either through a direct connection or wirelessly. Power is provided by a power source 634. Power can be provided directly to the sensors and microfluidic members through electrical connections that are positioned within walls of the container. Alternatively, the electrical connections may pass along the fluid transport members that provide fluid to the die.

If the controller communicates with the sensors and microfluidic members wirelessly, the sensor or the microfluidic member itself includes a transceiver within the packaging or on a same printed circuit board as the sensor. The controller can receive and process data from each sensor and respond accordingly. This arrangement allows for the system to implement advantages provided by the Internet of Things. In particular, each of the sensors may detect information, such as environmental parameters and qualities, which are then processed automatically by the controller. The controller may be programmed to automatically respond to these environmental parameters. Alternatively, the controller transmits the information to the remote user and the user may provide instructions to the system.

This system may be used in a user's home to allow for remote control of a growth environment for a selected type of plant. For example, tomatoes have a different set of growth conditions than a dahlia. The user can control the growth environment from their computing device, such as a cellphone, a laptop, or other computing system with an input, a display, and a processor. As the sensors detect aspects of the environment, the sensors provide the information to the user. The user can select adjustments to the system in response to the information.

Figure 18:
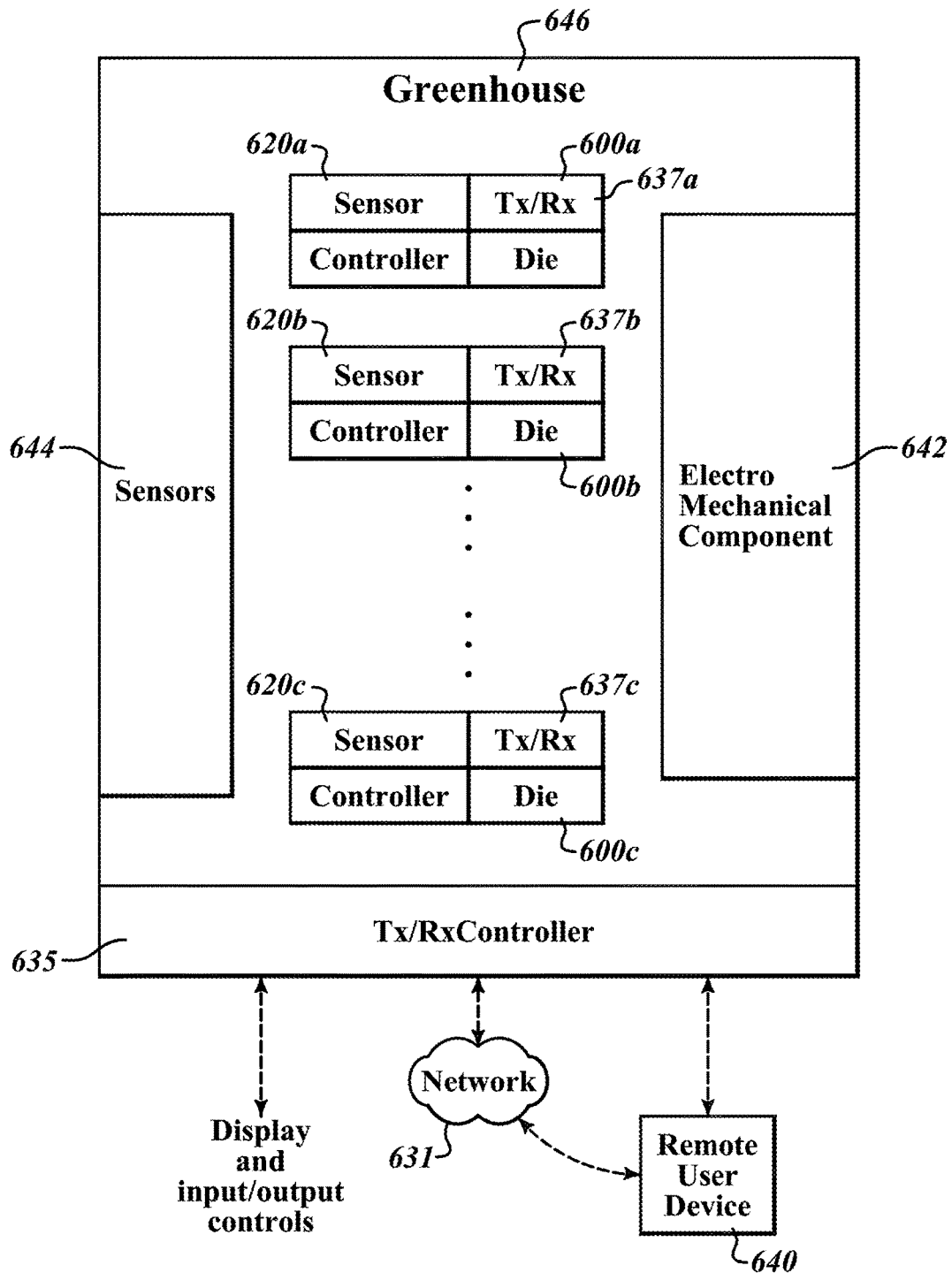
FIG. 18 is an aeroponics system configured to provide nutrients and water to a plurality of plants.

There may be a plurality of the systems 600 grouped together in a greenhouse 646, such that each system 600 has its own unique identifier stored in memory 633 in a greenhouse network 631, see FIG. 18 and systems 600a-600c. Each system communicates with a transceiver controller 635 with individual transceiver devices 637. The communication may be wirelessly, (e.g., a Wi-Fi transceiver, a Bluetooth transceiver, a cellular transceiver, a satellite transceiver, a GPS or SPS receiver, etc.).

The controller 624 of each system 600 can take advantage of the IoT, which allows any object to be addressable and accessible over a network. Generally, an Internet of Things (IoT) device is used to refer to any object (e.g., a light emitting device, a sensor, a microfluidic die, or other electromechanical devices) that has an addressable interface (e.g., an Internet protocol (IP) address, a Bluetooth identifier (ID), a near-field communication (NFC) ID, etc.) and can transmit information to one or more other devices over a wired or wireless connection, such as within the greenhouse network or from the greenhouse network to an external network 631 to a remove user device 640. The IoT device may have a passive communication interface, such as a quick response (QR) code, radio-frequency identification (RFID) tag, an NFC tag, or the like, or an active communication interface, such as a modem, a transceiver, a transmitter-receiver, or the like. The IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled and/or monitored by a central processing unit (CPU), microprocessor, ASIC, such as the transceiver controller 635 of the greenhouse.

Each IoT device is configured to be connected to a network such as a local ad-hoc network or the Internet, so long as the devices are equipped with an addressable communications interface for communicating with the IoT network. The IoT devices may also include cell phones, desktop computers, laptop computers, tablet computers, personal digital assistants (PDAs), etc. Accordingly, the IoT network may include devices that do not typically have Internet-connectivity (e.g., temperature or light sensors).

In this greenhouse environment, each system 600a-600c may include a single plant monitored by its own set of sensors or each system may include a plurality of plants, for example a group of plants from the same species. An adjacent system could be growing a different species of plant that has different growth criteria. Accordingly, system 600a could be growing one plant while system 600c is growing a different type of plant. The memory of each system can store information about the type of plant being grown. The transceiver controller 635 can receive data from the systems 600a-600c, process the data, and adjust the greenhouse collectively or adjust an individual system as needed. For example, the transceiver controller 635 controls electro-mechanical components 642 that are dispersed throughout the greenhouse. The electro-mechanical components 642 include grow lights, misters, shade providing panels to adjust light, panels in the greenhouse roof to allow outside air in, etc.

The transceiver controller 635 can periodically scan a variety of sensors 644 that are configured to observe and collect data about an interior of the greenhouse 646, such as temperature in various locations of the greenhouse and light intensity. The controller 635 can continually analyze the temperature at different locations to maintain a consistent temperature throughout or to maintain specific temperatures in different locations based on the specific growth criteria of different plants. The controller can also monitor the function and health of the electro-mechanical components in the greenhouse. If one is up for maintenance or has broken down, the controller can inform the use.

In one embodiment the greenhouse 646 has an internal network where each container or system has its own unique identifier and the greenhouse has its own unique IP address for communication through a standard internet network, such as network 631. The devices within the greenhouse will not have their own unique IP address for external communication; however, they are uniquely identifiable within their own network. The greenhouse may include one or more external antennas or integrated antennas, including, but not limited to Wi-Fi antennas, cellular antennas, satellite position system (SPS) antennas (e.g., global positioning system (GPS) antennas), etc.

This arrangement, utilizing IoT technology, allows smart grid and energy management to optimize delivery of energy and flexible or remote management of a growth facility. This arrangement allows the user to have centralized control over any device or system in the greenhouse or associated with the greenhouse.

The greenhouse 646 may include a computing terminal coupled to the transceiver controller 635, such as a computer, laptop, table, or other device that includes input and output devices. For example, there may be a display, keyboard, and mouse that display the data collected by the various sensors 644 and the specific sensors 620a-620c in each aeroponics system. The user can review the status of the entire greenhouse or narrow their review down to one system 600a-600c.

Stored in a memory associated with the controller, there may be a particular collection of software instructions executable by the controller 635 in order to carry out some functions associated with greenhouse management. The software instructions operatively configure hardware and other software in the greenhouse so that electronic data may be communicated through a network communication path to another network enabled device, such as the remote user device.

The controller is configured to store growth criteria for each of the various species of plants being grown in the systems 600a-600c, such that as one of the sensors detects an environmental parameter that exceeds or drops below a threshold, the controller can adjust the environment to optimize growth of that particular plant. For example, if there is a plant that is programmed to receive a certain level of light for a set period of time per day and it is a cloudy day, the controller can detect the low light environment and activate associated artificial lighting units aligned with the particular plant. The controller can continue to monitor the light received by that plant until the plant has received the appropriate amount of light for that period.

In one embodiment, the greenhouse may be a fully automated environment that is controlled by the controller 635 based on parameters programmed into the controller. The controller is configured to control actuators to open and close panels in the walls and roof the greenhouse, the controller is configured to control ejection of moisture into each of the aeroponics systems via the microfluidic die, and the controller is configured to control and manage temperature within the greenhouse and adjacent to each plant, to monitor levels of fluid in reservoirs of water or nutrients. In some embodiments, cameras or other image capturing devices may be provided to monitor fruit size. Actuators may be provided to move the cameras to various positions to monitor a variety of different pieces of fruit on a single plant.

The arrangements of the present disclosure, incorporating microfluidic die into aeroponics systems allows for digital control of water distribution. For example, a nozzle can be programmed to fire once a minute all of the way up to 200,000 drops in two seconds. The drop size can be selected from one pico-liter up to 60 pico-liters. A single die can receive two or more fluids to create on demand fluid-nutrient combinations, such as water and a nitrogen-rich fluid. In addition, a large format die may be created that includes thousands of nozzles for larger scale applications.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A system, comprising:
a container configured to support a plant; and
a microfluidic die positioned within the container, the die including:
a substrate;
a first insulating layer on the substrate;
a plurality of chambers in the first insulating layer;
a second insulating layer on the first insulating layer; and
a plurality of nozzles in the second insulating layer.

2. The system of claim 1, further comprising a controller coupled to the microfluidic die and configured to control the microfluidic die.

3. The system of claim 2, further comprising:
a transceiver coupled to the controller; and
a plurality of sensors coupled to the controller.

4. The system of claim 3 wherein:
the plurality of sensors are configured to detect environmental parameters and output environmental parameter signals;
the controller is configured to receive the environmental parameter signals and output a microfluidic die control signal in response to the environmental parameter signals.

5. The system of claim 3, further comprising:
a communication network;
the plurality of sensors are configured to detect environmental parameters and output environmental parameter signals;
the controller is configured to receive the environmental parameter signals and output data signals;
the transceiver is configured to transmit the data signals with the communication network.

6. The system of claim 1, further comprising:
a first fluid reservoir coupled to the microfluidic die; and
a second fluid reservoir coupled to the microfluidic die, the first fluid being different than the second fluid.

7. The system of claim 6, further comprising:
a first valve coupled between the reservoir and the microfluidic die;
a second valve coupled between the reservoir and the microfluidic die; and
processing circuitry configured to control the microfluidic die, the first valve, and the second valve.

8. The system of claim 7, further comprising:
a plurality of sensors coupled to the processing circuitry, each sensor configured to detect an environmental parameter and configured to output an environmental parameter signal, the processing circuitry is configured to receive the environmental parameter signals and to control the first valve and the second valve based on the environmental parameter signals.

9. The system of claim 1, further comprising a plurality of heaters configured to heat the plurality of chambers.

10. The system of claim 1, further comprising:
a fluid reservoir coupled to the microfluidic die;
a valve coupled between the reservoir and the microfluidic die; and
processing circuitry configured to control the microfluidic die and the valve.

11. The system of claim 10, further comprising:
a plurality of sensors coupled to the processing circuitry, each sensor configured to detect an environmental parameter and configured to output an environmental parameter signal, the processing circuitry is configured to receive the environmental parameter signals and to control the valve based on the environmental parameter signals.

12. The system of claim 11, further comprising:
a transceiver coupled to the processing circuitry, the transceiver configured to receive information from the processing circuitry regarding the environmental parameters and transmit the information to a remote user device.

13. The system of claim 12 wherein the transceiver is configured to receive instructions to control the microfluidic die and transmit the instructions to the processing circuitry to control the microfluidic die.

14. An aeroponics system, comprising:
a plurality of containers, each container configured to support and nurture at least one plant;
a fluid reservoir;
a plurality of microfluidic devices, each container including at least one microfluidic device, each microfluidic device including:
a substrate;
a plurality of chambers in fluid communication with the reservoir; and
a plurality of nozzles; and
a controller coupled to the microfluidic devices, the controller configured to control the microfluidic devices to provide fluid to the plants.

15. The system of claim 14, further comprising a plurality of humidity sensors, each container including one of the humidity sensors, the controller being configured to receive a signal from each of plurality of humidity sensors, determine if the signal is below a threshold humidity value, identify the container having the signal below the threshold humidity value, and activate the microfluidic device in the container.

16. The system of claim 14 wherein each container includes a group of microfluidic devices.

17. The system of claim 16 wherein each microfluidic device of the group is fixed to an interior wall of the container with the nozzles facing a central area of the container.

18. The system of claim 17 wherein each microfluidic device includes a printed circuit board, a microfluidic die positioned on the printed circuit board, a printed circuit board support that is fixed to the interior wall, the printed circuit board being configured to be removed from the printed circuit board support.

19. The system of claim 18 wherein the printed circuit board support includes electrical contacts configured to interact with electrical contacts on the printed circuit board, the printed circuit board support being coupled to the controller and being configured to transmit control signals from the controller to the microfluidic die.

20. The system of claim 14 wherein the microfluidic device includes piezoelectric ejection components.

21. The system of claim 14 wherein the microfluidic device includes heaters formed in the substrate.

22. A method, comprising:
detecting an environmental parameter value with one of a plurality of sensors;
comparing the environmental parameter value to a threshold value; and
controlling a microfluidic die positioned in a container supporting a plant in response to the comparing.

23. The method of claim 22 wherein the controlling further includes:
ejecting a fluid from the microfluidic die by activating a plurality of heaters in the microfluidic die.

24. The method of claim 23 wherein the activating includes activating the plurality of heaters for a selected time period based on the comparing.

25. The method of claim 24 wherein the controlling includes determining the selected time period by determining a difference between the environmental parameter value and the threshold value.

* * * * *